United States Patent [19]

Ziv

[11] 3,889,898
[45] June 17, 1975

[54] PIGGYBACK DUAL LOCK BAR

[75] Inventor: Avraham Ziv, Sepulveda, Calif.

[73] Assignee: American Safety Equipment Corporation, Encino, Calif.

[22] Filed: Apr. 10, 1974

[21] Appl. No.: 459,539

[52] U.S. Cl. ............................ 242/107.4; 242/107.4
[51] Int. Cl. ............................................. A62b 35/02
[58] Field of Search .................... 242/107.4, 107; 297;386;388/; 280/150 SB; 74/575, 577 R, 578

[56] References Cited
UNITED STATES PATENTS

| 3,122,339 | 2/1964 | Whittingham | 242/107.4 |
| 3,397,849 | 8/1968 | Hansen | 242/107.4 |
| 3,578,260 | 5/1971 | Kell | 242/107.4 |

Primary Examiner—George F. Mautz

[57] ABSTRACT

An emergency locking safety belt retractor mechanism includes a belt winding reel, at least one reel associated ratchet member having a plurality of ratchet teeth, dual locking pawl means mounted for engaging the ratchet teeth of the ratchet member and inertia responsive means for actuating one of the locking pawl means into locking engagement with the associated ratchet member. The dual locking pawl means include a pair of locking pawls mounted to the retractor in piggyback or overlying relation such that in the event the first locking pawl fails to lock with the ratchet member because of a pawl bounce condition, its deflective motion away from the ratchet member causes it to engage and move the second locking pawl into a locking condition with ratchet member, locking the reel against further protraction of the webbing.

7 Claims, 6 Drawing Figures

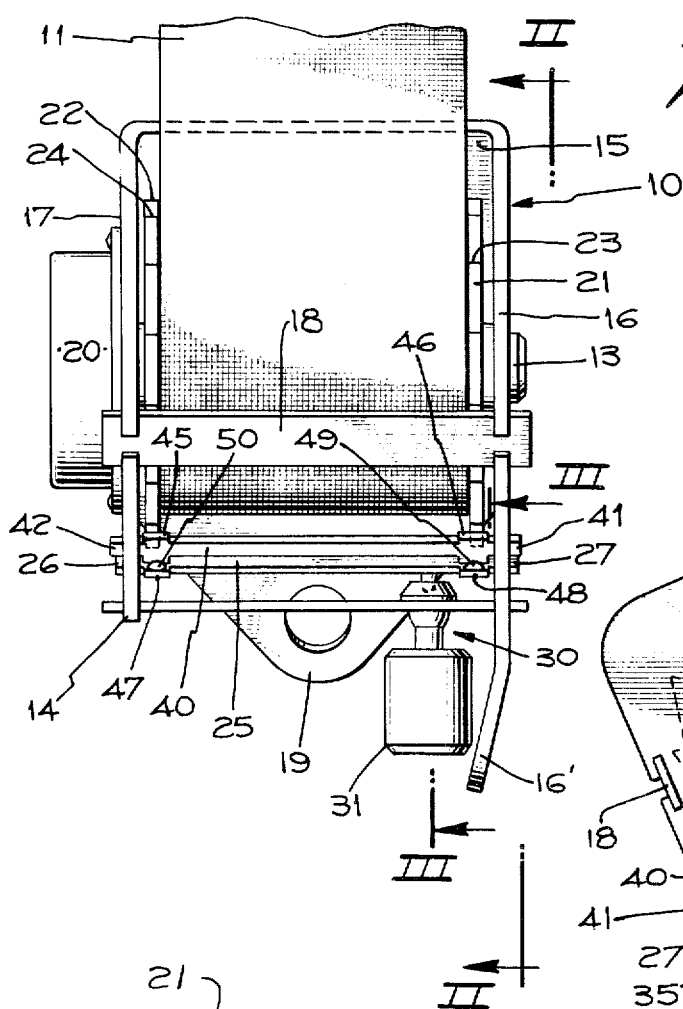

PIGGYBACK DUAL LOCK BAR

BACKGROUND OF THE INVENTION

This invention relates in general to emergency locking safety belt retractor mechanisms for use in adjustably anchoring safety belts of seat belt and/or harness assemblies employed for restraining passengers in vehicle seats during emergency conditions. More particularly, the present invention relates to a fail safe locking mechanism for inertia locking safety belt retractors as aforedescribed wherein a dual locking pawl means is provided such that one or the other thereof will assuredly lock the retractor upon an emergency condition experienced by the vehicle.

Emergency locking retractor mechanisms of various types have been developed and placed into commercial use heretofore wherein the locking pawl means have been actuated manually, automatically on a protraction movement of the webbing or an acceleration thereof above a predetermined rate, and in response to changes in inertia of the vehicle in which the mechanism is mounted. In all of these types of retractors, particularly wherein a ratchet wheel associated with the webbing storage reel is provided for engagement by a locking pawl, a pawl bounce condition can occur. It has been found, particularly in the dynamic conditions experienced during emergency conditions encountered by a moving vehicle, that it is possible for the tip of a locking pawl to come into engagement with the tip of a tooth of the ratchet wheel member in such manner that the pawl is rebounded or deflected away from the ratchet wheel rather than moving into a locking engagement with the ratchet wheel and thus preventing further protraction of the webbing. The failure of the locking pawl to lock up in the so called pawl bounce condition allows undesired protraction of the webbing which may cause a reduction in the efficiency of operation of the retractor mechanism.

It has therefore been recognized that a locking pawl means for emergency locking retractors is needed which will lock up assuredly under emergency conditions even though a "pawl bounce" condition may occur wherein the leading edge or tip of the pawl fails to clear the leading edge of the oncoming tooth of the ratchet wheel revolving in response to protraction of the webbing in an emergency situation. There have been prior attempts to solve this problem through the provision of dual locking pawl mechanisms of various types. However, it is believed that none of these prior attempts have included mechanisms having a construction or mode of operation, as contemplated for the within invention wherein a second pawl of the locking pawl means is actuated in response to the movement of the first pawl means imparted by the occurrence of a pawl bounce condition.

SUMMARY OF THE INVENTION

Therefore it is the primary object of the present invention to disclose and provide an improvement in locking pawl means for emergency locking safety belt retractor mechanisms which will provide for a positive and assured lock up of the retractor upon an emergency condition even though the primary locking pawl may encounter a false locking or pawl bounce condition.

It is the further object of the present invention to disclose and provide an improvement in locking pawl means as in the foregoing object wherein the actuation or movement of a secondary or fail safe locking pawl is provided by the deflective or bounce movement of the primary locking pawl away from the associated ratchet member provided in association with the belt storage reel.

It is a still further object of the present invention to disclose and provide an improvement in locking pawl means as in the foregoing objects wherein a novel construction and mode of operation is provided by a pair of locking pawls co-operating together to provide for a positive and assured lock up of the retractor ratchet wheel associated with the webbing or safety belt wherein the energy or momentum imparted in a locking failure or pawl bounce condition to the primary locking pawl is imparted directly and positively to the secondary locking pawl to cause it to promptly and positively lock the retractor reel against further undesired protraction of the webbing or safety belt.

Generally, the apparatus according to the present invention, is suitable for use in various types of emergency locking safety belt retractors having a locking pawl for preventing belt protraction from the retractor by engagement with a tooth of a ratchet wheel member, having a plurality of ratchet teeth, associated with the belt re-wind reel. In addition to the primary locking pawl noted, a fail safe locking pawl is provided together with means for mounting it to the retractor in position to be moved into engagement with the teeth of the ratchet wheel member. As particularly contemplated within the present invention, means are provided for movably mounting the primary locking pawl to provide for its movement against the fail safe pawl to move the latter into locking engagement with a ratchet tooth upon a deflective movement of the primary locking pawl relative to the ratchet member, as when the primary locking pawl engages a tip of a ratchet tooth in a so called pawl bounce condition and is deflected away from such member.

More particularly, the means for mounting the fail safe locking pawl mounted with its forward ratchet engaging portions in generally adjacent and overlying relation to rearward portions of the primary locking pawl, which is pivotally mounted to the retractor mechanism. Upon actuation of the primary pawl, due to an emergency condition sensed by the retractor mechanism, the primary pawl will normally engage the ratchet reel and lock up the mechanism. However, if a leading edge of the primary locking pawl engages the leading tip of the on-coming ratchet wheel tooth and is deflected thereby, means are provided for mounting the primary locking pawl so that it will pivot about an approximate mid portion, midway between the leading and trailing edges thereof, and bring a rearward portion thereof up under the leading edge of the fail safe pawl, moving the latter into locking engagement with the tooth of the ratchet wheel in a positive, fail safe manner. Undue protraction of the webbing or safety belt associated with the mechanism is thereby avoided.

The various advantages and improvements of the present invention in locking pawl means for emergency locking safety belt retractors, as well as a better understanding thereof, will be obtained by those skilled in the art from a consideration of the following detailed description of a preferred exemplary embodiment of the present invention. Reference will be made to the appended sheets of drawings which will be described briefly before the detailed description of the preferred exemplary embodiment.

BRIEF DESCRIPTION OF THE DRAWINGS

FIG. 1 is an elevational view of an exemplary emergency locking safety belt retractor mechanism of the vehicle inertia responsive type employing the improvement in locking pawl means in accordance with the present invention;

FIG. 2 is a side elevation of the retractor mechanism of FIG. 1 taken therein along the plane II—II;

FIG. 6 is a view of the mechanism of FIG. 3 showing a fail safe locking of the improvement in locking pawl means in accordance with the present invention upon the occurrence of a pawl bounce condition as illustrated in FIG. 5.

DETAILED DESCRIPTION OF THE PREFERRED EXEMPLARY EMBODIMENT

Figure 3:
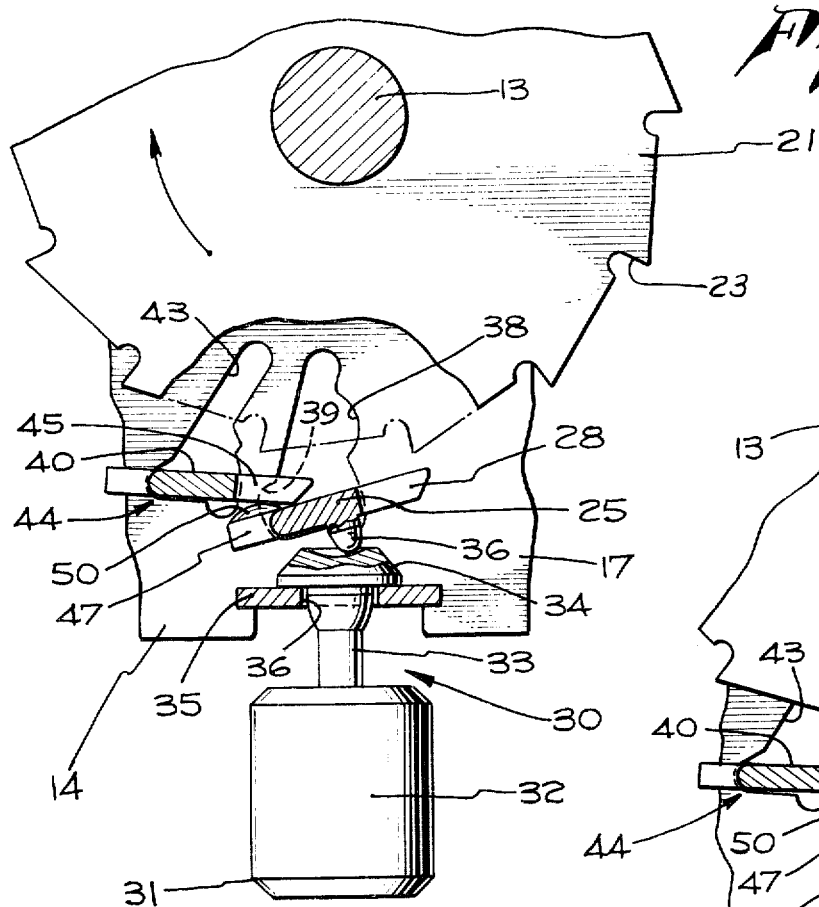
FIG. 3 is a detail section view of the improvement in locking pawl means of the retractor mechanism of FIG. 1 taken therein along the plane III—III showing the locking pawl means and associated vehicle inertia responsive means in a rest position.

Referring firstly to FIGS. 1 and 2, the preferred exemplary embodiment of emergency locking safety belt retractor mechanism in which the improvement of the present invention is illustrated as indicated generally at 10. The illustrative retractor mechanism includes a safety belt or webbing 11 wound upon a reel or drum (not shown) fixed about a reel axle 13. Axle 13 is journled in retractor frame 14 which, as is conventional, is of a generally U-shaped configuration including base 15 and parallel, spaced side walls 16 and 17. A cross brace 18 is provided for added rigidity for the retractor frame.

The retractor mechanism of FIGS. 1 and 2 may be installed in conventional manner in a vehicle, such as an automobile, by bolting base 15 at the anchor portion 19 to the vehicle frame. The retractor mechanism, indicated generally at 10, is normally positioned in the vehicle adjacent a passenger seat in a position to mount the vehicle inertia means in operative condition (as more fully disclosed hereinafter) and to position the safety belt or webbing 11 for a protraction about the vehicle passenger. As is normal in retractor mechanisms of this type, the retractor reel is biased toward a belt re-wound or retracted condition by a clock type spring provided in association with axle 13 within a housing 20 mounted to the frame side wall 17.

A pair of ratchet wheels or members 21 and 22, as best seen in FIG. 1, are provided in association with the reel and axle 13 to facilitate locking the reel against protraction of the webbing in emergency situations. As is conventional heretofore, each of the ratchet wheel members 21 and 22 is provided with a plurality of teeth 23 and 24 respectively.

In prior art retractor mechanism constructions, it has been common to employ a single locking pawl, and in some instances two separate locking pawls, acting independently of one another, for engaging a reel associated ratchet member, as members 21 and 22 herein, for causing lockup of the mechanism and preventing further protraction of the webbing 11. As will be discussed hereinafter in detail, the improvement in locking pawl means of the present invention includes the provision of a dual locking pawl assembly wherein there is co-operation between a pair of locking pawls for causing lockup in a fail safe manner in spite of potential pawl bounce conditions. One of such locking pawls is provided in the exemplary embodiment by a locking bar 25 mounted for pivotal movement about its ends 26 and 27 mounted in co-operating slots (more fully explained hereinafter) provided in the retractor frame side walls 16 and 17. Locking bar 25 is provided with a pair of spaced locking pawls, positioned to engage the pair of ratchet wheel members 21 and 22, one of such pawls being seen at 28 in FIGS. 2 through 6.

Inertia responsive means are provided in the exemplary embodiment of retractor mechanism for actuating locking bar 25, and its associated locking pawls, into engagement with the teeth 23, 24 of ratchet members 21 and 22, respectively. In the exemplary embodiment, an otherwise conventional vehicle inertia reponsive type mechanism is illustrated generally at 30 and includes a pendulum 31 having a mass 32 suspended by stem or neck 33 from the head or actuator member 34. As best seen in FIGS. 3 through 6, the head or actuator member 35 seats upon a support plate 35 with the stem or neck portion depending through an aperture 36 provided in the support. As seen in FIG. 2, side wall 16 has a depending portion 16' which protects mass 32 from interfering relationship with a retractor housing or other possibly interfering means when the retractor has been installed in a vehicle for its intended use.

As is particularly contemplated within the present invention, a dual locking pawl assembly which is believed to be fail safe is provided in the heretofore otherwise conventional mechanism described in order to assure prompt lockup of the retractor mechanism in the event of an emergency condition arising. Such dual locking pawl assembly includes the provision of first and second locking pawls and means for mounting each to the retractor mechanism in position to be moved into engagement with the ratchet teeth of the ratchet members, the first pawl being operated by the inertia responsive means indicated generally at 30 and the second locking pawl being operated by a movement of the first locking pawl which occurs when the first ratchet pawl bounces off of a ratchet tooth in a deflective movement away from the ratchet member as will now be explained in detail.

Figure 4:
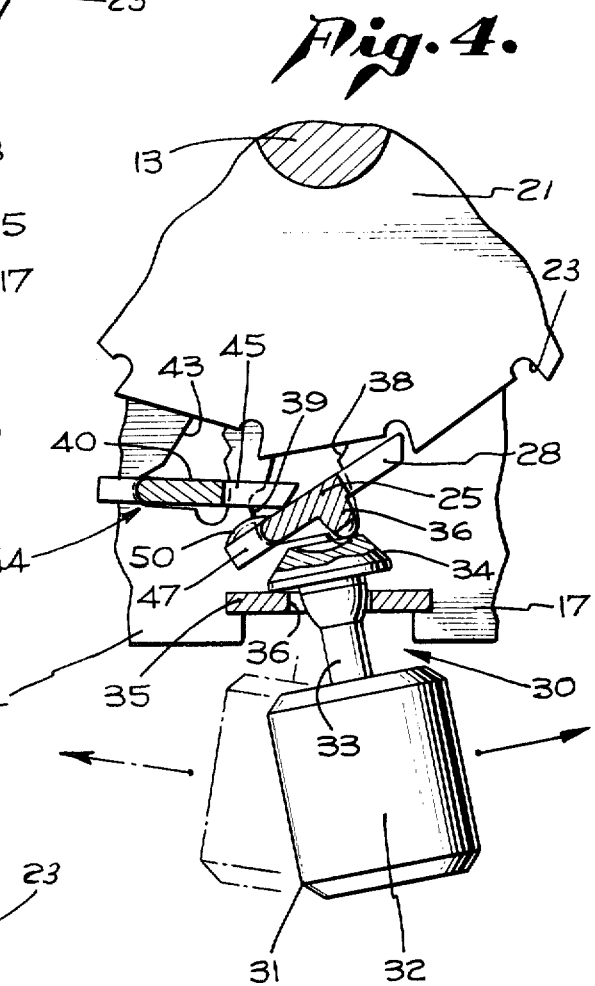
FIG. 4 is a view of the mechanism of FIG. 3 showing the normal locking mode thereof.

The first locking pawl of the dual locking pawl assembly of the present invention is provided by either, or both of the pawls provided upon the locking bar 25. As seen in FIG. 3, when the retractor mechanism is in at rest condition, a depending pin or dimple 36 on the underside of locking bar 25 rests in an upwardly facing dished support surface 37 of actuator 34. In an emergency situation, upon sudden change of vehicle inertia, the mass 32 of the inertia responsive means will be set in motion causing actuator 34 to pivot upon support 35, raise locking bar pin 36 as seen in FIG. 4 and thus pivot the associated pawls, as pawl 28, into a locking relation to the reel associated ratchet members, as member 22 in FIG. 4. In this normal operation of the within dual locking pawl assembly, the locking bar 25, and associated pawls pivot about the bar ends 26, 27 where they rest in the lower rear portions of the bar mounting slots provided in the retractor frame side walls 16 and 17. Referring specifically to FIGS. 3 and 4, slot or cut out 38 in side wall 17 (duplicated in side wall 16 but not shown) has a lower rearward portion (to the left in FIGS. 3 and 4) about which the lower rear edge portions of the associated bar end pivots. However, it should be noted that slot 38 is provided with an arcuate portion 39 which allows such rearward lower portions of the bar ends freedom of movement in a verticle direction in FIGS. 3 through 6 to facilitate a pivoting movement of the locking bar in an unconventional manner as part of the novel operation and cooperation between the dual locking pawl or bar assembly of the present invention. Such movement of the lock bar 25 is illustrated in FIG. 6 and will be discussed in more detail hereinafter.

Second locking pawl means of the dual locking pawl assembly is provided in the exemplary embodiment by the provision of the second locking bar 40 which is provided with means for mounting it to the retractor mechanism in a position to be moved into engagement with the ratchet teeth by the first locking pawl means upon the occurrence of a pawl bounce condition with regard to the latter. The locking bar 40 is mounted by its respective ends 41 and 42 in co-operating slots provided in the retractor frame side walls 16 and 17 respectively. As seen in FIGS. 3 through 6, each slot, as slot or cutout 43, is provided in the respective side walls, as side wall 17 for slot 43, to pivotally mount the locking bar for pivotal movement about a lower rear edge portion of the ends 41 and 42. As seen in FIG. 3, slot 43 is formed with a generally mating configuration at 44 to restrain bar 40 to pivotal movement about a generally fixed axis adjacent its rearward edge portions (as seen by comparing FIGS. 3 through 5 with FIG. 6). Locking bar 40 is provided with a pair of locking pawls 45 and 46 as seen in FIG. 1.

As also contemplated within the present invention, the dual locking pawl means or assembly of the present invention includes the provision of the two locking bars 25 and 40, and thus their associated pawls, in a generally overlying or piggyback relationship as best seen in FIGS. 3 through 6. The forward portions of locking bar 40, provided by the pawl portions 45 and 46, as pawl 45 is in FIGS. 3 through 6, overly rearward portions of the first locking bar 25, including specifically a pair of rearwardly extending abutment portions 47 and 48 formed in bar 25. These abutment portions 47 and 48 extend rearwardly of the associated pawls provided in the locking bar 25 and, in the preferred exemplary embodiment, are provided with embossments 49 and 50, respectively, to facilitate abutting engagement with the underside of the pawls 45 and 46 of locking bar 40, as seen in FIG. 6. This will occur during pivoting motion of the lock bar 25 from the condition of FIG. 5 to that of FIG. 6 as will now be explained.

Figure 5:
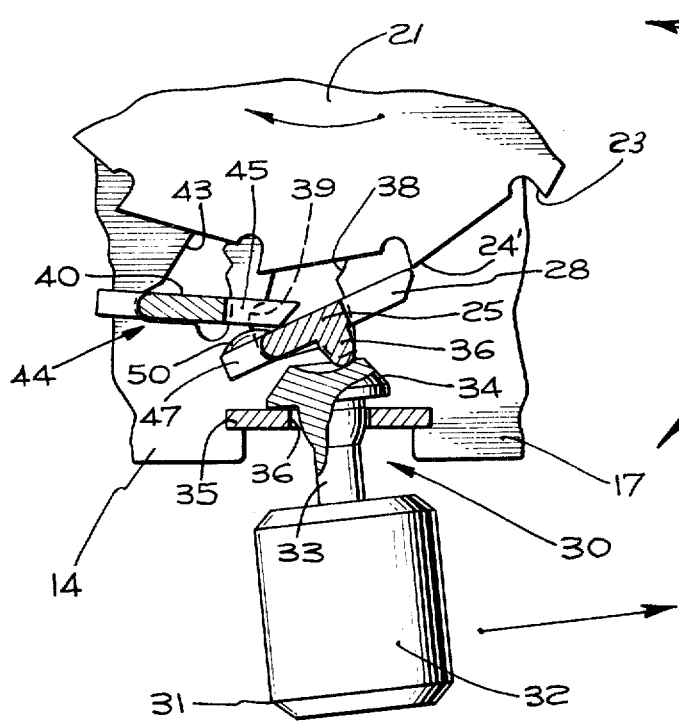
FIG. 5 is a view of the mechanism of FIG. 3 illustrating a pawl bounce condition.

It has been found that during the dynamic conditions attendant emergency situations in locking seat belt retractors to hold the associated passenger in his vehicle seat, that it is possible for the leading edge or tip of the locking pawl to make contact with the leading edge or tip of the first adjacent tooth of the ratchet teeth and, rather than locking the retractor via engagement with that particular tooth, a pawl bounce or unlocking motion is imparted to the locking pawl due to the momentum of the ratchet wheel which causes the pawl to move in a deflective unlocking motion away from the ratchet wheel. This pawl bounce or locking failure condition is illustrated in FIG. 5. While it is likely that the pawl would then lock in the next successive ratchet tooth, it is preferred that the attendant protraction of seat belt webbing due thereto be avoided if possible. In accordance with the present invention, when the pawl bounce condition of FIG. 5 occurs, the locking bar 25 and associated pawls will be pivoted by the impact of the leading tip of tooth 24' to cause the locking bar to pivot about pin 36 and thereby raise abutment portion 47, and its associated embossment 49 beneath the associated pawl of lock bar 40 to pivot the latter into the condition of FIG. 6 and locking engagement with the tooth 24'. Such pivoting movement for lock bar 25 is facilitated through the provision of the dished surface 37 on actuator 34 beneath bar pin 36 and, importantly, the provision of the arcuate portion 39 of slot 38. The dual locking bar and pawl assembly thus provided by locking bars 25 and 40, and their associated pawls, assures a positive lock up of the retractor reel promptly under emergency conditions through the novel cooperation between the two locking bars and associated pawls.

I claim:

1. A fail safe locking mechanism for emergency locking safety belt retractors having a primary locking pawl for preventing belt protraction from the retractor by engaging a tooth of a ratchet wheel member having a plurality of ratchet teeth and comprising:

a fail safe pawl and means for mounting it to said retractor in position to be moved to engage with teeth of said ratchet wheel member; and means for moveably mounting said primary locking pawl to provide for its movement against said fail safe pawl to move the latter into engagement with a ratchet tooth of said ratchet member upon a deflective movement of said primary locking pawl relative to said ratchet member, as when said locking pawl engages a tip of a ratchet tooth and is deflected away from said ratchet member.

2. The fail safe locking mechanism of claim 1 wherein:

said fail safe pawl mounting means mounts said fail safe pawl with a forward portion thereof in overlying relation to a rearward portion of said locking pawl.

3. The fail safe locking mechanism of claim 2 wherein:

said means for moveably mounting said locking pawl includes means for pivotally mounting said locking pawl for pivotal movement about an approximate midportion thereof between forward and rearward portions of said locking pawl to provide a pivotal movement to said locking pawl rearward portion upon said deflective movement.

4. The fail safe locking mechanisms of claim 1 wherein a vehicle inertia responsive means is provided with an actuator member for moving said locking pawl into engagement with said ratchet wheel member upon change of vehicle inertia and wherein said means for mounting said locking pawl includes the provision of pivot means between said locking pawl and said actuator member and mounting slots in the retractor for retaining said locking pawl therein and allowing for pivotal motion of both forward and rearward portions thereof.

5. The fail safe locking mechanism of claim 1 wherein:

said locking pawl is provided with embossment means on the rearward portion thereof for engagement with the underside of said fail safe pawl generally adjacent a forward portion thereof.

6. In an emergency locking safety belt retractor mechanism including a belt winding reel, at least one reel associated ratchet member having a plurality of ratchet teeth, locking pawl means mounted for engaging the ratchet teeth of said ratchet member on actuator thereof and emergency responsive means for actuating said pawl to lock said reel via said ratchet member, the improvement in locking pawl means comprising the provision of:

a dual locking pawl assembly including first and second locking pawls and means for mounting each to said mechanism in position to be moved into engagement with said ratchet teeth, said first pawl being operated by said emergency responsive means;

and means for actuating said second locking pawl by the defective movement of said first locking pawl in the event said first locking pawl strikes a ratchet tooth tip and is defected thereby upon actuation from said emergency responsive means.

7. The improvement in locking pawl means of claim 6 wherein said means for actuating said second locking pawl by said first locking pawl includes the provision of abutment means on a rearward portion of said first pawl underlying a forward portion of said second locking pawl and said first locking pawl is pivotally mounted to pivot said abutment means against said second pawl forward portion.

* * * * *